(12) United States Patent
Miki et al.

(10) Patent No.: US 9,413,949 B2
(45) Date of Patent: Aug. 9, 2016

(54) DIGITAL-PHOTO ANALYZING APPARATUS AND COMPUTER-READABLE MEDIUM STORING DIGITAL-PHOTO ANALYZING PROGRAM

(71) Applicant: Visionarist Co., Ltd., Ikoma-shi, Nara (JP)

(72) Inventors: Sukeichi Miki, Ikoma (JP); Manabu Miki, Ikoma (JP)

(73) Assignee: Visionarist Co., Ltd., Ikoma-shi (JP)

( * ) Notice: Subject to any disclaimer, the term of this patent is extended or adjusted under 35 U.S.C. 154(b) by 0 days.

(21) Appl. No.: 14/747,126

(22) Filed: Jun. 23, 2015

(65) Prior Publication Data

US 2015/0373259 A1    Dec. 24, 2015

(30) Foreign Application Priority Data

Jun. 24, 2014 (JP) ................................ 2014-129674

(51) Int. Cl.
*H04N 5/232* (2006.01)
*H04N 5/235* (2006.01)

(52) U.S. Cl.
CPC ......... *H04N 5/23222* (2013.01); *H04N 5/2353* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 5,915,133 A * | 6/1999 | Hirai | ........................ | G02B 7/28 396/147 |
| 7,012,638 B1 * | 3/2006 | Yokonuma | ......... | H04N 5/23245 348/207.99 |
| 7,525,592 B2 * | 4/2009 | Kato | .................... | H04N 5/2351 348/229.1 |
| 7,925,153 B2 * | 4/2011 | Kubota | .................. | H04N 5/232 348/362 |
| 8,144,230 B2 * | 3/2012 | Watanabe | ................ | G03B 7/00 348/333.02 |
| 8,896,742 B2 * | 11/2014 | Fukushima | ........ | H04N 5/23212 348/229.1 |

(Continued)

FOREIGN PATENT DOCUMENTS

| | | |
|---|---|---|
| JP | 11-242255 A | 9/1999 |
| JP | 2006-1 7801 5 | 7/2006 |

(Continued)

*Primary Examiner* — Michael Osinski
(74) *Attorney, Agent, or Firm* — Crowell & Moring LLP

(57) ABSTRACT

Digital-photo analyzing apparatus and computer-readable medium storing a digital-photo analyzing program for presenting the relationship between respective values and the quality of a digital photo based on a shutter speed, a TV value, a diaphragm value, an AV value, an ISO sensitivity, or a shooting record EV value of the digital photo. The digital-photo analyzing apparatus displays: a two-dimensional matrix using the shutter speed as a scale, the TV value, the diaphragm value, the AV value, or the shooting record EV value; and a three-dimensional matrix further using the ISO sensitivity as a scale. The two-dimensional matrix and the three-dimensional matrix display a plot or a thumbnail of the digital photo. Reference to the two-dimensional matrix or the three-dimensional matrix displaying the plot or the thumbnail allows a user to recognize the relationship between the digital photo and various values and analyze the various values affecting on the quality of the digital photo.

10 Claims, 9 Drawing Sheets

(56) References Cited

U.S. PATENT DOCUMENTS

| | | | |
|---|---|---|---|
| 8,970,716 B2* | 3/2015 | Kodama | H04N 5/2351 348/220.1 |
| 9,100,599 B2* | 8/2015 | Kubota | H04N 5/2352 |
| 9,277,134 B2* | 3/2016 | Hamada | H04N 5/23293 |
| 2003/0007076 A1* | 1/2003 | Okisu | H04N 5/23245 348/222.1 |
| 2005/0007487 A1* | 1/2005 | Miyoshi | G01B 11/25 348/362 |
| 2005/0044112 A1* | 2/2005 | Yamamoto | G06F 17/30038 |
| 2006/0093346 A1* | 5/2006 | Ishiyama | G03B 17/14 396/287 |
| 2007/0206941 A1* | 9/2007 | Maruyama | G03B 5/00 396/153 |
| 2012/0008040 A1* | 1/2012 | Miyata | H04N 5/2353 348/362 |
| 2014/0333800 A1* | 11/2014 | Sugie | H04N 5/2355 348/229.1 |
| 2015/0015774 A1* | 1/2015 | Sugie | H04N 5/2353 348/364 |
| 2015/0138392 A1* | 5/2015 | Sugawara | H04N 5/2353 348/226.1 |
| 2015/0237262 A1* | 8/2015 | Hamada | H04N 5/23293 348/333.11 |
| 2015/0358563 A1* | 12/2015 | Watanabe | H04N 5/3532 348/296 |
| 2016/0037046 A1* | 2/2016 | Nashizawa | H04N 5/2355 348/229.1 |

FOREIGN PATENT DOCUMENTS

| | | |
|---|---|---|
| JP | 2012-169819 A | 9/2012 |
| JP | 2013-172418 A | 9/2013 |

\* cited by examiner

FIG.2

| TAG NAME | VALUE |
|---|---|
| : | : |
| SHUTTER SPEED | 1/250 |
| DIAPHRAGM VALUE | F8 |
| ISO SENSITIVITY | 100 |
| THUMBNAIL | |
| : | : |

| TAG NAME | VALUE |
|---|---|
| : | : |
| SHUTTER SPEED | 1/30 |
| DIAPHRAGM VALUE | F2.8 |
| ISO SENSITIVITY | 400 |
| THUMBNAIL | |
| : | : |

| TAG NAME | VALUE |
|---|---|
| : | : |
| SHUTTER SPEED | 4 |
| DIAPHRAGM VALUE | F2 |
| ISO SENSITIVITY | 1600 |
| THUMBNAIL | |
| : | : |

DIGITAL-PHOTO ANALYZING APPARATUS AND COMPUTER-READABLE MEDIUM STORING DIGITAL-PHOTO ANALYZING PROGRAM

BACKGROUND

1. Technical Field

The present invention relates to a digital-photo analyzing apparatus and a computer-readable medium storing a digital-photo analyzing program for visually clearly indicating the correlation relationship between a plurality of shooting parameters related to a shooting condition of a digital photo so as to allow viscerally and objectively evaluating and analyzing the shooting condition and the artistic quality of the digital photo.

2. Related Art

In recent years, a digital single-lens reflex camera or similar camera, which can set detailed values related to various shooting conditions as shooting condition parameters, has become popular. Accordingly, there is a growing need that a photographer wants to specify the values of the shooting condition for the digital single-lens reflex camera by manual setting so as to take an artistically expressed digital photo or a digital photo emphasizing the characteristic of a photographic subject. However, the shooting condition parameters include a plurality of parameters such as a diaphragm value, a shutter speed, and an ISO sensitivity. Therefore, a problem has arisen in that the photographer cannot easily and intuitively understand the effects of these values on the quality of the digital photo.

The photographer has to analyze the correlation relationship between the digital photo and the shooting condition parameters to learn the influence of the shooting condition parameters on the digital photo. However, especially in the case where the photographer is a beginner, it has been extremely difficult to understand the correlation relationship with many shooting parameters such as a shutter speed, a diaphragm value, an ISO sensitivity, a camera model, a lens type, a shooting date and time, and a shooting location, which are described together with the photograph shot by a professional photographer based on these parameters. It has been impossible to easily improve their shooting techniques by manual setting. Accordingly, the beginner photographer has to gain a lot of experiences to learn the shooting technique of an advanced photographer or a professional photographer, and thus has to be coached by a professional photographer or study the shooting technique at a school to coach the shooting technique.

Therefore, a known technique displays a cursor and an appropriate exposure band on a display screen disposed on a digital camera so as to allow facilitating the manual setting of the shooting condition parameters in the digital camera (for example, see Japanese Unexamined Patent Application Publication No. 2006-178015).

However, the technique described in Japanese Unexamined Patent Application Publication No. 2006-178015 performs shooting while simultaneously confirming the correlation relationship between an exposure value, a diaphragm value, and a shutter speed value on the display screen disposed on the digital camera before shooting. It has been impossible to weigh the quality of the digital photo as the shooting result against the EV value, the diaphragm value, the shutter speed value, and the ISO sensitivity at the time of shooting. In particular, it has been impossible to analyze or examine the effect of the ISO sensitivity on the digital photo. Furthermore, it has been impossible to compare a plurality of digital photos with the shooting condition parameters of these digital photos at the same time to analyze the correlation relationships between the qualities of the digital photos and the shooting condition parameters.

The present invention has been made to solve the above-described problems, and it is an object of the present invention to provide a digital-photo analyzing apparatus and a computer-readable medium storing a digital-photo analyzing program for displaying a plot or a thumbnail corresponding to a digital photo in a two-dimensional matrix or a three-dimensional matrix using a shooting condition parameter as a scale, so as to allow the user to easily and intuitively understand the correlation relationship between the digital photo and the shooting condition parameter.

SUMMARY

One aspect of the present invention is a digital-photo analyzing apparatus for analyzing a digital photo. The digital photo holds attached information that stores: a diaphragm value; a shutter speed; and an ISO sensitivity when the digital photo is shot. The digital-photo analyzing apparatus includes an input unit, a storage unit, a display unit, and a control unit. The input unit is configured to receive an instruction from a user. The storage unit is configured to store the digital photo and the attached information. The display unit is configured to display a two-dimensional matrix and the digital photo. The two-dimensional matrix includes: an X-axis using any one of the shutter speed and a TV value as a scale: and a Y-axis that is perpendicular to the X-axis and using any one of the diaphragm value and an AV value as a scale. The control unit is configured to calculate a shooting record EV value based on the AV value, the TV value, and the ISO sensitivity. The two-dimensional matrix further includes a U-axis using the shooting record EV value in a diagonal direction determined by the X-axis and the Y-axis as a scale.

$$-\log_2\left(\frac{ISO\ \text{Sensitivity}}{100}\right)$$

The control unit is configured to calculate the shooting record EV value of the digital photo based on a specified formula in response to a selection of the digital photo through the input unit. The specified formula has the AV value, the TV value, and the ISO sensitivity as variables. The specified formula is as follows.

Shooting Record EV Value=AV Value+TV Value+ Sensitivity Correction Value     Formula The sensitivity correction value is $$-\log_2\left(\frac{ISO\ \text{Sensitivity}}{100}\right).$$

The digital-photo analyzing apparatus is configured to display a plot or a thumbnail of the digital photo on the two-dimensional matrix based on: any one of the shutter speed and the TV value; and any one of the diaphragm value and the AV value.

The control unit may be configured to display the shooting record EV value for the digital photo corresponding to the plot or the thumbnail on the display unit in response to a selection of one of the plot and the thumbnail displayed on the two-dimensional matrix through the input unit.

The control unit may be configured to: compare the shooting record EV value on a U-axis in the two-dimensional matrix in one of the plot and the thumbnail with the shooting record EV value calculated for the digital photo corresponding to one of the plot and the thumbnail in response to a selection of one of the plot and the thumbnail displayed on the two-dimensional matrix through the input unit: and change a scale on the U-axis to the calculated shooting record EV value for a display on the display unit in a case where the shooting record EV value on the U-axis is different from the calculated shooting record EV value.

The control unit may be configured to: display a three-dimensional matrix, which further includes a Z-axis that is perpendicular to the X-axis and the Y-axis and uses the ISO sensitivity as a scale, on the display unit instead of the two-dimensional matrix; and display one of the plot and the thumbnail on the three-dimensional matrix based on: any one of the shutter speed and the TV value; any one of the diaphragm value and the AV value; and the ISO sensitivity, in response to a selection of the digital photo through the input unit.

The control unit may be configured to display a shooting record EV value plane on the display unit in response to an input of the shooting record EV value through the input unit. The shooting record EV value plane has the mutually identical shooting record EV values within the three-dimensional matrix.

Another aspect of the present invention is a computer-readable medium storing a digital-photo analyzing program for calculating a shooting record EV value of a digital photo using a computer. The computer includes: a storage unit configured to store the digital photo and attached information storing a diaphragm value, a shutter speed, and an ISO sensitivity that are held by the digital photo when the digital photo is shot; an input unit configured to receive an instruction from a user, a display unit configured to display the digital photo; and a control unit configured to control the storage unit, the display unit, and the input unit. The control unit causes the computer to execute steps of: calculating, displaying a two-dimensional matrix, and displaying a plot or a thumbnail. The calculating calculates the shooting record EV value of the digital photo based on a specified formula in response to a selection of the digital photo through the input unit, the specified formula having the AV value, the TV value, and the ISO sensitivity of the digital photo as variables. The specified formula is as follows.

Shooting Record EV Value=AV Value+TV Value+ Sensitivity Correction Value          Formula The sensitivity correction value is $$-\log_2\left(\frac{ISO\ Sensitivity}{100}\right).$$

The displaying a two-dimensional matrix displays a two-dimensional matrix on the display unit, the two-dimensional matrix including: an X-axis using any one of the shutter speed and the TV value as a scale; a Y-axis using any one of the diaphragm value and the AV value as a scale; and a U-axis using the shooting record EV value in a diagonal direction determined by the mutually perpendicular X and Y axes as a scale. The displaying a plot or a thumbnail displays a plot or a thumbnail of the digital photo on the two-dimensional matrix based on: any one of the shutter speed and the TV value; and any one of the diaphragm value and the AV value of the digital photo.

The control unit may further cause the computer to execute a step of: displaying the shooting record EV value for the digital photo corresponding to the plot or the thumbnail on the display unit in response to a selection of one of the plot and the thumbnail displayed on the two-dimensional matrix through the input unit.

The control unit may further cause the computer to execute steps of: comparing the shooting record EV value on a U-axis in the two-dimensional matrix in one of the plot and the thumbnail with the shooting record EV value calculated for the digital photo corresponding to one of the plot and the thumbnail in response to a selection of one of the plot and the thumbnail displayed on the two-dimensional matrix through the input unit; and changing a scale on the U-axis to the calculated shooting record EV value for a display on the display unit in a case where the shooting record EV value on the U-axis is different from the calculated shooting record EV value.

The control unit may further cause the computer to execute steps of: displaying a three-dimensional matrix, which further includes a Z-axis that is perpendicular to the X-axis and the Y-axis and uses the ISO sensitivity as a scale, on the display unit instead of the two-dimensional matrix; and displaying one of the plot and the thumbnail on the three-dimensional matrix based on: any one of the shutter speed and the TV value; any one of the diaphragm value and the AV value; and the ISO sensitivity, in response to a selection of the digital photo through the input unit.

The control unit may further cause the computer to execute a step of: displaying a shooting record EV value plane on the display unit in response to an input of the shooting record EV value through the input unit. The shooting record EV value plane has the mutually identical shooting record EV values within the three-dimensional matrix.

The digital-photo analyzing apparatus according to the present invention displays the two-dimensional matrix using, as the shooting condition parameters, any one of the shutter speed and the TV value, any one of the diaphragm value and the AV value, and the shooting record EV value as the scales. Reference to the plot or the thumbnail displayed on the two-dimensional matrix allows the user of the digital-photo analyzing apparatus to analyze the shooting condition parameters affecting on the quality of the digital photo. Furthermore, the digital-photo analyzing apparatus calculates, as the shooting condition parameter, the shooting record EV value dependent on the ISO sensitivity. Accordingly, reference to the two-dimensional matrix allows the user to analyze the shooting record EV value as the specific value calculated by the digital-photo analyzing apparatus.

BRIEF DESCRIPTION OF DRAWINGS

FIG. 2 is a diagram illustrating one example of the relationship between digital photos and attached information according to this embodiment;

DETAILED DESCRIPTION

Figure 1:
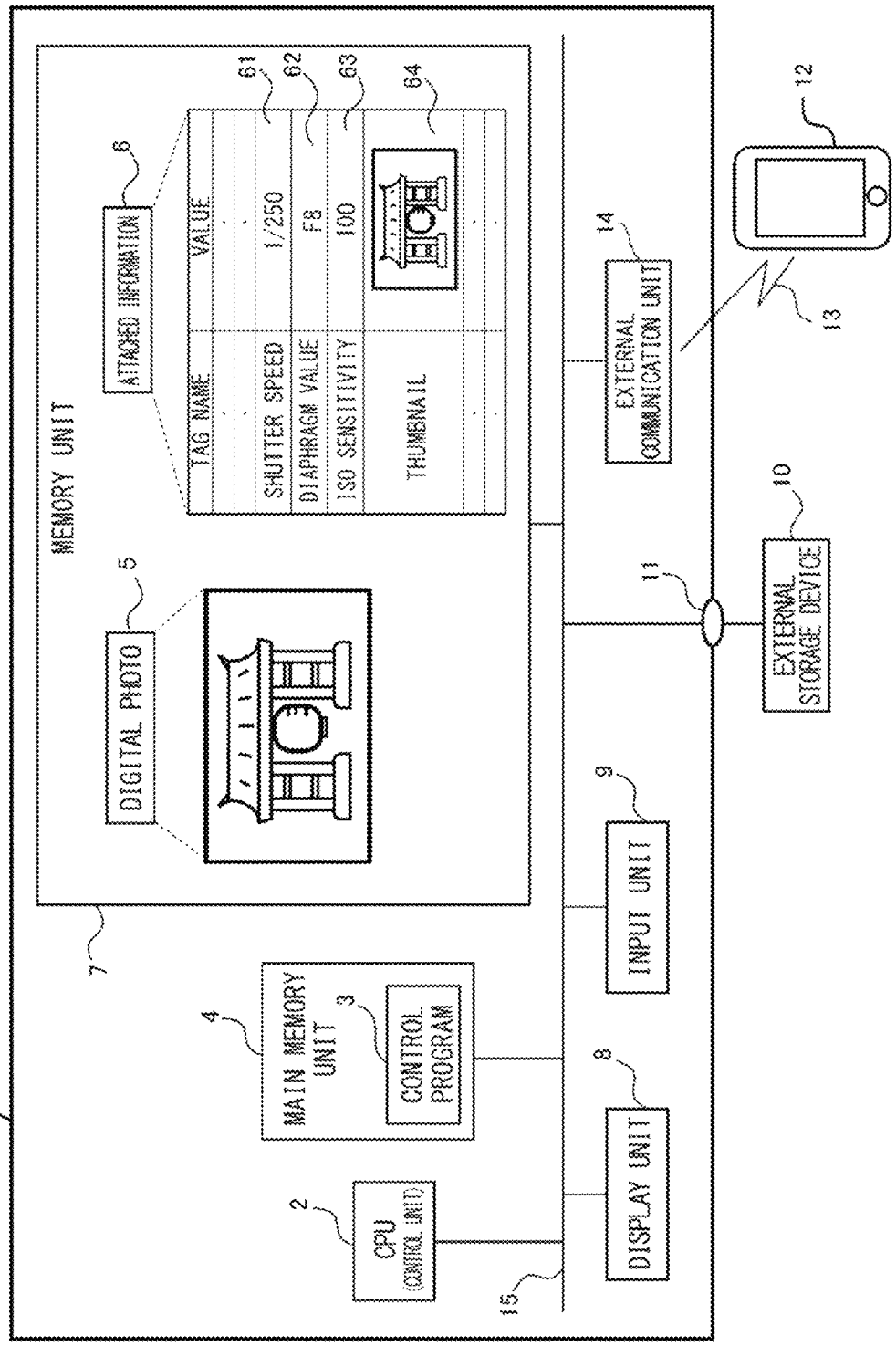
FIG. 1 is a block diagram of a digital-photo analyzing apparatus according to an embodiment of the present invention.

The following describes a digital-photo analyzing apparatus according to an embodiment of the present invention with reference to the drawings. FIG. 1 illustrates the configuration of an apparatus 1 according to this embodiment (abbreviated as the apparatus). The apparatus 1 includes: a CPU 2 (control unit), which controls the apparatus 1; a main memory unit 4 (computer-readable medium storing a digital-photo analyzing program), which stores a control program 3 for controlling the apparatus 1; a storage unit 7, which stores a digital photo 5 and attached information 6 associated with the digital photo 5; a display unit 8, which displays the digital photo 5; an input unit 9, which receives an instruction to the apparatus 1; a storage-device coupling portion 11, which couples to an external storage device 10 storing the digital photo 5; and an external communication unit 14, which communicates with an external terminal 12 via a wireless network 13. These members couple to a bus 15.

Here, the digital photo 5 is a photograph in digital format shot by, for example, a digital camera, a digital single-lens reflex camera, or a smart phone with a camera. The attached information 6 is, for example, an Exchangeable image file format for digital still cameras (Exif) file attached to the digital photo 5. The attached information 6 holds at least a shutter speed 61, a diaphragm value 62, an ISO sensitivity 63, and a thumbnail 64.

The shutter speed 61, the diaphragm value 62, and the ISO sensitivity 63 are values set by the digital camera or the digital single-lens reflex camera when the digital photo 5 is recorded. The shutter speed 61 is synonymous with an exposure time. The thumbnail 64 is a thumbnail image of the digital photo 5. The input unit 9 is, for example, a keyboard, a computer mouse, or a touchscreen. The storage-device coupling portion 11 is a USB connector or a LAN cable connector. The external terminal 12 is, for example, a server, a personal computer, a smart phone, a tablet terminal, or a digital camera having a communication function. The external communication unit 14 may be configured to communicate with the external terminal 12 via a wired network instead of the wireless network 13.

FIG. 2 illustrates one example of the relationship between the digital photo 5 and the attached information 6. FIG. 2 illustrates three sheets of digital photos 5a to 5c as the digital photos 5, and illustrates pieces of attached information 6a to 6c as respective pieces of the attached information 6 for the digital photos 5a to 5c. The pieces of attached information 6a to 6c hold respective shutter speeds 61a to 61c, diaphragm values 62a to 62c, ISO sensitivities 63a to 63c, and thumbnails 64a to 64c. The digital photos 5a to 5c have mutually different values of the shutter speeds 61a to 61c, the diaphragm values 62a to 62c, and the ISO sensitivities 63a to 63c. These different values provide mutually different qualities of the digital photos 5a to 5c, so as to give different impressions to a viewer. The photographer sets the digital camera to manual setting to set the shutter speeds 61a to 61c, the diaphragm values 62a to 62c, and the ISO sensitivities 63a to 63c at the time of shooting, so as to allow changing the expressions of the digital photos 5a to 5c.

Figure 3:
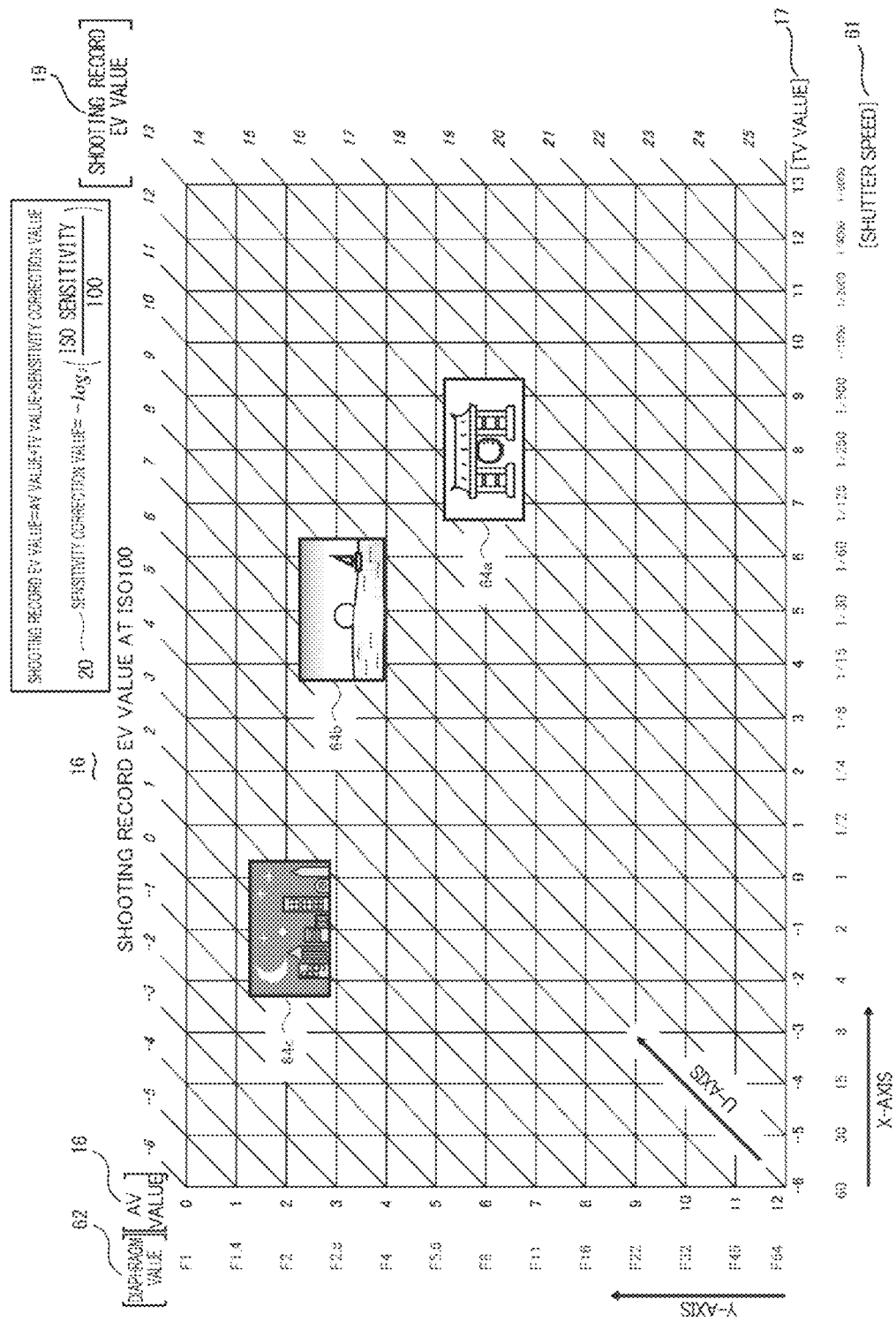
FIG. 3 is a diagram illustrating one example of a two-dimensional matrix according to this embodiment.

FIG. 3 illustrates one example of a two-dimensional matrix 16. The two-dimensional matrix 16 is displayed on the display unit 8 in response to the selection of the digital photo 5 and the input of an instruction for displaying the two-dimensional matrix 16 through the input unit 9 by the user. The two-dimensional matrix 16 is configured by the mutually perpendicular X and Y axes. The U-axis is further configured in the diagonal direction defined by the X-axis and the Y-axis below the two-dimensional matrix 16, a TV value 17 and the shutter speed 61 are displayed in parallel as the scale of the X-axis. On the left side of the two-dimensional matrix 16, an AV value 18 and the diaphragm value 62 are displayed in parallel as the scale of the Y-axis. Above and on the right side of the two-dimensional matrix 16, a shooting record EV value 19 is displayed as the scale of the U-axis. Furthermore, above the two-dimensional matrix 16, the calculation basis of the shooting record EV value 19 is displayed together with a sensitivity correction value 20.

The TV value 17 is calculated by the CPU 2 based on the shutter speed 61 and Formula 1. In the two-dimensional matrix 16, −6 to 13 as the TV value 17 respectively correspond to 60 to 1/8000 as the shutter speeds 61.

[Mathematical 1]

$$\text{TV Value} = -\log_2(\text{Shutter Speed}) \quad \text{Formula 1}$$

The AV value 18 is calculated by the CPU 2 based on the diaphragm value 62 and Formula 2. In the two-dimensional matrix 16, 12 to 0 as the AV value 18 respectively correspond to F64 to F1 as the diaphragm value 62.

[Mathematical 2]

$$\text{AV Value} = 2\log_2(\text{Diaphragm Value}) \quad \text{Formula 2}$$

Here, in the configuration of this embodiment, the TV value 17 and the AV value 18 are calculated by the CPU 2 based on Formula 1 and Formula 2. The TV value 17 and the AV value 18 may be calculated by, for example, the external terminal 12 such as a digital camera. In this case, the attached information 6 of the digital photo 5 holds the TV value 17 and the AV value 18 that are calculated by the external terminal 12 as predetermined tag name and value.

The shooting record EV value 19 is calculated by the CPU 2 based on the TV value 17, the AV value 18, and the ISO sensitivity 63 of the digital photo 5 and Formula 3.

[Mathematical 3]

$$\text{Shooting Record EV Value} = \text{AV Value} + \text{TV Value} + \text{Sensitivity Correction Value} \quad \text{Formula 3}$$

In this embodiment, the sensitivity correction value 20 is defined by Formula 4.

[Mathematical 4]

$$\text{Sensitivity Correction Value} = -\log_2\left(\frac{\text{ISO Sensitivity}}{100}\right) \quad \text{Formula 4}$$

In FIG. 3, the two-dimensional matrix 16 displays the shooting record EV value 19 in the case where the ISO sensitivity 63 is 100.

Formula 3 and Formula 4 are specified formulas specific to the present invention to be used in the apparatus 1. The shooting record EV value 19 is different from the EV value conventionally used in general. Here, a conventional EV value will be described. The conventional EV value usually employs the calculating formula (EV=AV+TV) referred to as the APEX system. APEX stands for Additive system of Photographic Exposure, and is determined by American National Standards Institute (ASA).

The APEX system is the calculating formula in the case where the ISO sensitivity is 100 with reference to the condition where the EV value becomes 0 in the case where the ISO sensitivity is 100, the diaphragm value is F1, and the shutter speed is 1 second. However, in the case where the ISO sensitivity changes, to know the EV value, it is necessary to increment the EV value by −1 for each multiple for intensification by one step, for example, when the ISO sensitivity is set to 200 and then the ISO sensitivity is set to 400, so as to correct the EV value. In the case where the ISO sensitivity is 50, the EV value is incremented by +1.

In APEX, the calculating formula taking into consideration the sensitivity correction value 20 in this embodiment is not defined. Because APEX was designed in an era when a photograph was shot using a film, the kinds of the ISO sensitivity of the film only included, including an ISO sensitivity of 100, an ISO sensitivity of 50, an ISO sensitivity of 400, and an ISO sensitivity of 800. However, today, push development and development after desensitizing are performed not using a film, but using gain adjustment by a computer built in a digital camera. Accordingly, auto setting of the ISO sensitivity results in completely different digital photos one by one. Additionally, it is possible to create a digital photo having an unlimited ISO sensitivity that can change from the single digits up to the digits after the decimal point.

Because of this situation, to know the EV value of the digital camera, it is required to perform fine sensitivity correction on not an integer value, but a value after the decimal point. Therefore, the apparatus 1 has the configuration that calculates not the conventional EV value, but the shooting record EV value 19 and the sensitivity correction value 20, which are not used in another device and specific to the apparatus 1. The apparatus 1 uses Formula 3 in which the various ISO sensitivities 63 can be reflected, so as to calculate the shooting record EV value 19 uniquely employed by the apparatus 1.

In FIG. 3, the two-dimensional matrix 16 displays the thumbnails 64a to 64c of the digital photos 5a to 5c. The two-dimensional matrix 16 displays the thumbnails 64a to 64c in response to the selection of the digital photos 5a to 5c through the input unit 9. When the digital photo 5a is selected, the CPU 2 refers to the attached information 6a of the digital photo 5a to acquire the shutter speed 61a and the diaphragm value 62a. Subsequently, the CPU 2 specifies the coordinate as the intersection point between the X-axis and the Y-axis on the two-dimensional matrix 16 based on the shutter speed 61a and the diaphragm value 62a, so as to display the thumbnail 64a on the specified coordinate.

This allows the user to select one sheet or a plurality of the digital photos 5 so as to display the thumbnail 64 on the two-dimensional matrix 16. From the displayed position of the thumbnail 64, the user can know the specific values of the TV value 17, the shutter speed 61, the AV value 18, and the diaphragm value 62 of the digital photo 5 and the correlation relationship with these values. The user can refer to these values and the thumbnail 64 so as to validate and analyze the effects of the TV value 17, the shutter speed 61, the AV value 18, and the diaphragm value 62 on the quality of the digital photo 5.

Furthermore, the two-dimensional matrix 16 displays the shooting record EV value when the ISO sensitivity 63 is 100. Accordingly, in the case where the ISO sensitivity 63 of the digital photo 5 is 100, the user can refer to the shooting record EV value 19 as the scale of the U-axis so as to also validate and analyze the shooting record EV value 19 affecting the quality of the digital photo 5.

The user might set exposure compensation for the digital photo 5. For example, shooting methods include a function referred to as Auto Exposure Bracketing (AEB), which automatically changes the exposure value to shot a plurality of sheets of photos. Usually, shooting is performed while three exposure values are continuously changed. The user can display the thumbnails 64 of the three digital photos 5 shot using the different exposure values in the two-dimensional matrix 16 so as to determine the digital photo 5 that suits user's own taste.

The digital photo 5 might be shot while the exposure compensation is set such that the AV value 18 is constant (in aperture priority AE) or the TV value 17 is constant (in shutter speed priority AE). In this case, the two-dimensional matrix 16 displays the thumbnails 64 of the digital photos 5 shot before and after the exposure compensation is performed, so as to allow the user to confirm the effect of the exposure compensation. The two-dimensional matrix 16 displays an arrow from the thumbnail 64 of the digital photo 5 shot before the exposure compensation toward the thumbnail 64 of the digital photo 5 shot after the exposure compensation, so as to visually clearly indicate the effect of the exposure compensation to the user.

Figure 4:
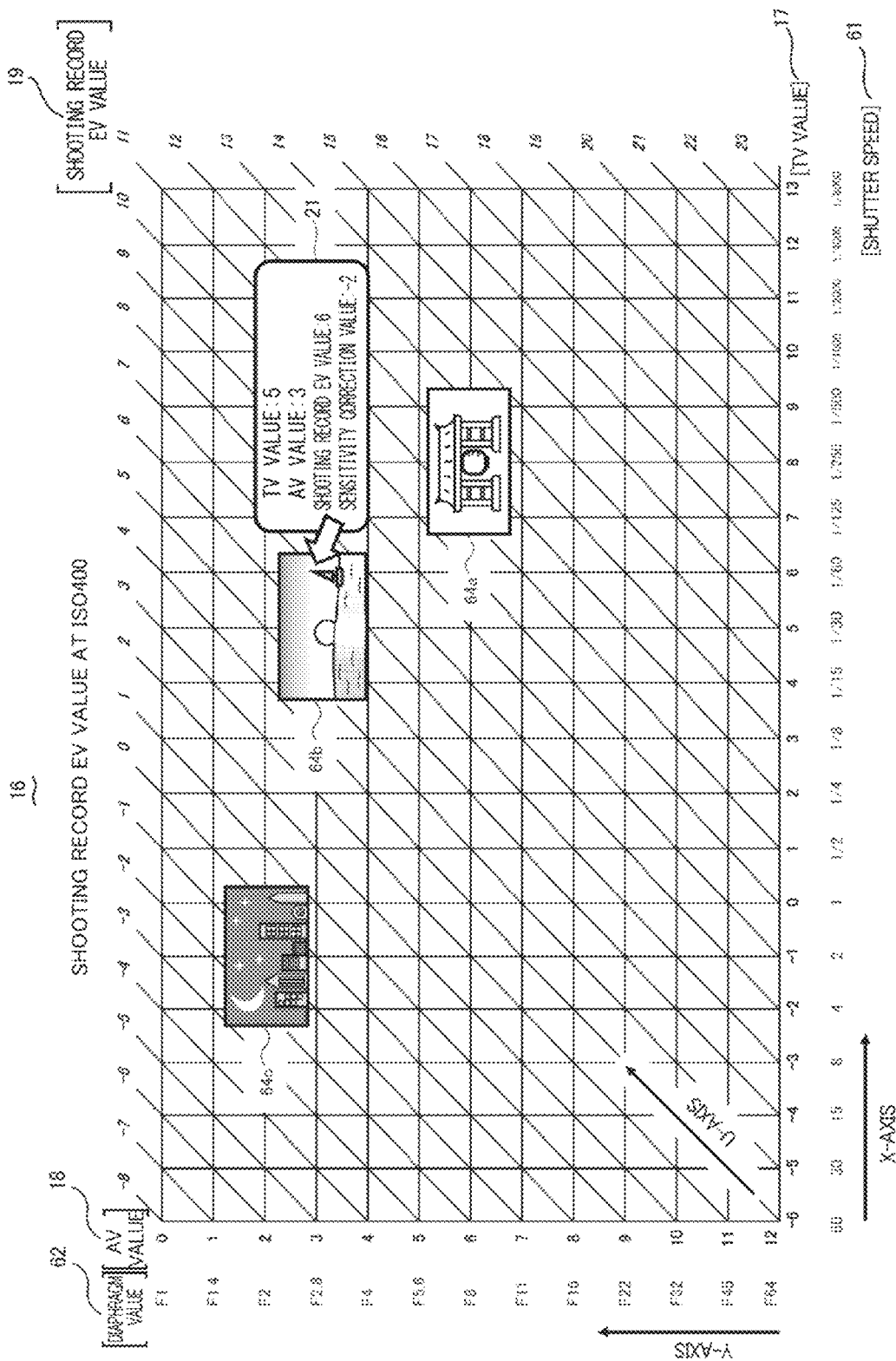
FIG. 4 is a diagram illustrating one example of the two-dimensional matrix in the case where a thumbnail is selected according to this embodiment.

FIG. 4 illustrates one example of the two-dimensional matrix 16 in the case where the thumbnail 64 is selected. In FIG. 4, the display unit 8 displays the thumbnails 64a to 64c on the two-dimensional matrix 16, and the thumbnail 64b is selected through the input unit 9. In response to the selection of the thumbnail (64b, the CPU 2 refers to the attached information 6b so as to calculate the TV value 17, the AV value 18, and the shooting record EV value 19 of a digital photo 5b corresponding to the thumbnail 64b.

The display unit 8 displays the TV value 17, the AV value 18, and the shooting record EV value 19, which are calculated by the CPU 2, and the sensitivity correction value 20 in a display window 21. The user can refer to the display window 21 to easily know the TV value 17, the AV value 18, and the shooting record EV value 19 of the digital photo 5b corresponding to the selected thumbnail 64b.

Furthermore, the CPU 2 refers to the ISO sensitivity 63b held in the attached information 6b so as to recognize the condition where the ISO sensitivity 63b is 400. The CPU 2 calculates the shooting record EV value 19 in the case where the ISO sensitivity 63b is 400, based on Formulas 3 and 4. The display unit 8 changes and displays the scale of the shooting record EV value 19 such that the shooting record EV value 19 as the scale of the U-axis in the two-dimensional matrix 16 becomes the shooting record EV value 19 calculated by the CPU 2. In the case where the ISO sensitivity 63b is 400, the sensitivity correction value 20 becomes "−2." Accordingly, the display window 21 displays TV VALUE: 5, AV VALUE: 3, SHOOTING RECORD EV VALUE: 6, and SENSITIVITY CORRECTION VALUE: −2.

Thus, also in the case where the plurality of thumbnails 64 of the digital photos 5 having the different ISO sensitivities 63 is displayed in the two-dimensional matrix 16, the CPU 2 changes the scale of the U-axis to the shooting record EV value 19 appropriate for the selected thumbnail 64 in response to the selection of one of the thumbnails 64 by the user. Accordingly, the user can select the thumbnail 64 so as to know the accurate shooting record EV value 19 of the selected thumbnail 64. The user can select the thumbnail 64 to change the scale of the U-axis to the shooting record EV value 19 appropriate for the thumbnail 64 and display the scale so as to obtain the position of the thumbnail 64 regarding the shooting record EV value 19.

Figure 5:
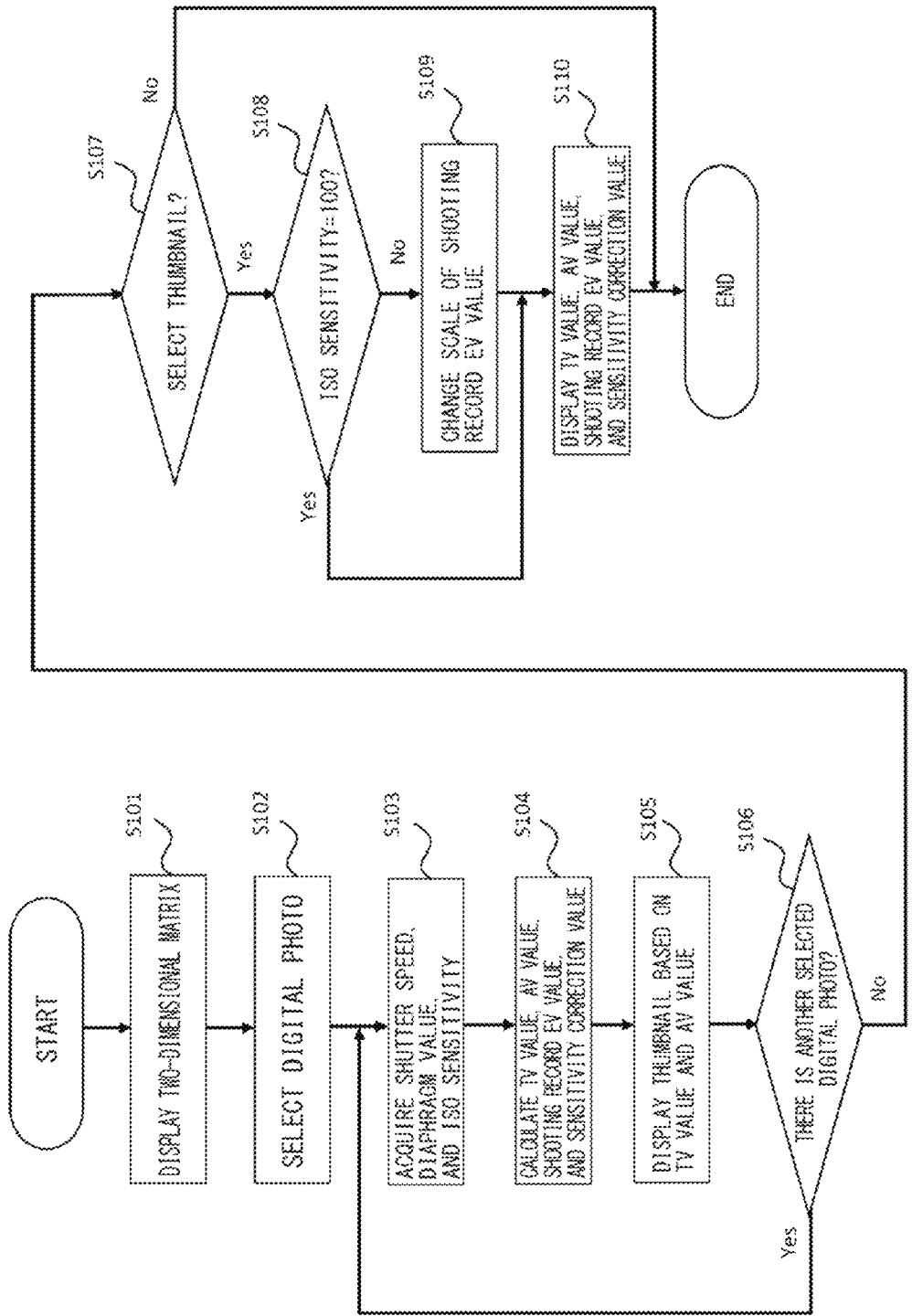
FIG. 5 is a flowchart illustrating a display process of the two-dimensional matrix according to this embodiment.

FIG. 5 illustrates the procedure of the display process of the two-dimensional matrix 16 according to this embodiment. The CPU 2 displays the two-dimensional matrix 16 on the display unit 8 in response to an input of the instruction for displaying the two-dimensional matrix 16 through the input unit 9 (in S101). At this time, the two-dimensional matrix 16 is assumed to display, as the scale of the U-axis, the shooting record EV value 19 in the case where the ISO sensitivity 63 is 100.

The CPU 2 refers to the attached information 6 of the selected digital photo 5 in response to the selection of the digital photo 5 through the input unit 9 (in S102), so as to acquire the shutter speed 61, the diaphragm value 62, and the ISO sensitivity 63 (in S103). In step S102, the digital photo 5 is selected by specifying the file name, clicking the icon of the digital photo 5, or dragging the icon of the digital photo 5 onto the two-dimensional matrix 16.

The digital photo 5 may be selected by specifying a folder that holds a plurality of the digital photos 5 through the input unit 9. The apparatus 1 may be configured to select the digital photo 5 in response to storing of the digital photo 5 or a folder holding the digital photo 5 in the external storage device 10 coupled to the apparatus 1. Furthermore, the apparatus 1 may be configured to select the digital photo 5 in response to reception of the digital photo 5 or a folder holding the digital photo 5 through the external communication unit 14.

The CPU 2 calculates the TV value 17, the AV value 18, the shooting record EV value 19, and the sensitivity correction value 20 of the digital photo 5 based on the shutter speed 61, the diaphragm value 62, and the ISO sensitivity 63, which are acquired in step S103, and Formulas 1 to 4 (in S104). Based on the calculated TV value 17 and AV value 18, the CPU 2 causes the display unit 8 to display the thumbnail 64 of the selected digital photo 5 on the two-dimensional matrix 16 (in S105). The CPU 2 determines whether another selected digital photo 5 is present (in S106).

When another selected digital photo 5 is present in step S106 (Yes in S106), the CPU 2 executes the processes in steps S103 to S106. On the other hand, in step S106, when another selected digital photo 5 is not present (No in S106), the CPU 2 executes the process in step S107. The CPU 2 determines whether one of the thumbnails 64 displayed on the two-dimensional matrix 16 through the input unit 9 is selected (in S107).

In step S107, in the case where the thumbnail 64 is not selected (No in S107), the CPU 2 terminates the display process for the two-dimensional matrix 16. On the other hand, in step S107, in response to the selection of one of the thumbnails 64 (Yes in S107), the CPU 2 determines whether the ISO sensitivity 63 held in the attached information 6 corresponding to the selected thumbnail 64 is 100 (in S108). In the case where the ISO sensitivity 63 is 100), the CPU 2 executes the process in step S110.

On the other hand, in the case where the ISO sensitivity 63 is not 100 in step S108 (No in S108), the CPU 2 changes and displays the scale of the shooting record EV value 19 of the two-dimensional matrix 16 on the display unit 8 such that the scale becomes the shooting record EV value 19 of the digital photo 5 corresponding to the selected thumbnail 64 (in S109). Accordingly, also in the case where the plurality of the thumbnails 64 having different values of the ISO sensitivity 63 are displayed on the two-dimensional matrix 16, the user can select one of the thumbnails 64 so as to change the scale of the shooting record EV value 19 on the two-dimensional matrix 16 to the shooting record EV value 19 corresponding to the ISO sensitivity 63 of the selected thumbnail 64.

The CPU 2 displays the TV value 17, the AV value 18, the shooting record EV value 19, and the sensitivity correction value 20 of the digital photo 5 corresponding to the selected thumbnail 64 within the display window 21 (in S110), and then terminates the display process for the two-dimensional matrix 16. The user can confirm the display window 21 to know the TV value 17, the AV value 18, the shooting record EV value 19, and the sensitivity correction value 20 of the digital photo 5 corresponding to the selected thumbnail 64.

Figure 6:
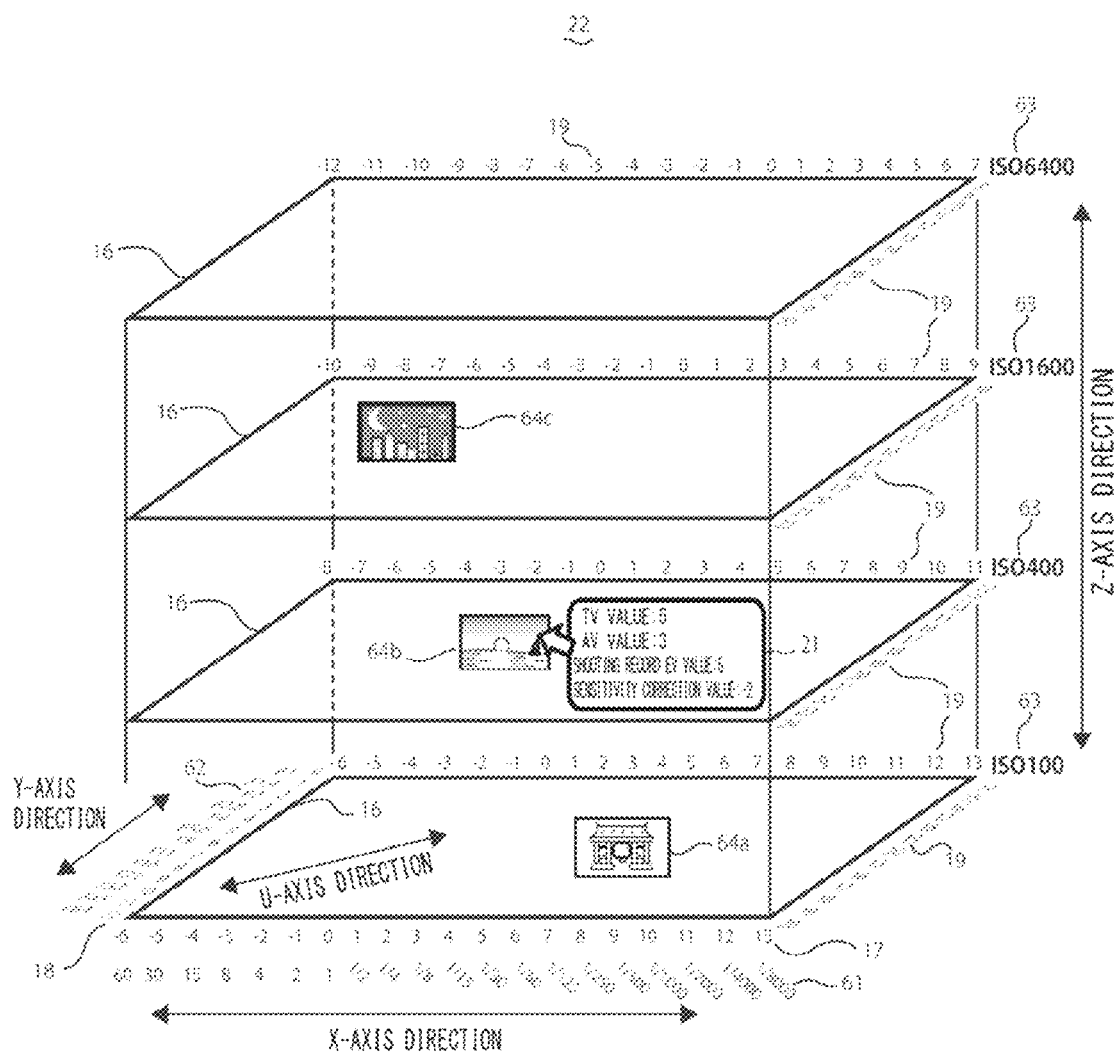
FIG. 6 is a diagram illustrating one example of a three-dimensional matrix according to this embodiment.

FIG. 6 illustrates one example of a three-dimensional matrix 22. The three-dimensional matrix 22 is displayed on the display unit 8 in response to the selection of the digital photo 5 through the input unit 9 by the user and the input of the instruction for displaying the three-dimensional matrix 22. The three-dimensional matrix 22 includes a plurality of the two-dimensional matrices 16, and includes the Z-axis perpendicular to the X-axis and the Y-axis of the two-dimensional matrix 16. The three-dimensional matrix 22 displays the ISO sensitivity 63 as the scale of the Z-axis. Here, the three-dimensional matrix 22 displays 100, 400, 1600, and 6400 as the ISO sensitivity 63. The plurality of the two-dimensional matrices 16 display the shooting record EV values 19 corresponding to the values of the ISO sensitivity 63 as the scales.

The three-dimensional matrix 22 displays the thumbnails 64a to 64c corresponding to the digital photos 5a to 5c selected by the user. The thumbnails 64a to 64c are displayed on the three-dimensional matrix 22 based on: the shutter speeds 61a to 61c, the diaphragm values 62a to 62c, and the ISO sensitivities 63a to 63c of the digital photos 5a to 5c; or the TV value 17, the AV value 18, and the ISO sensitivities 63a to 63c of the digital photos 5a to 5c. The user can confirm the thumbnail 64 displayed on the three-dimensional matrix 22 and the position of the thumbnail 64 to know the quality, the TV value 17, the shutter speed 61, the AV value 18, the diaphragm value 62, the shooting record EV value 19, the ISO sensitivity 63, and the sensitivity correction value 20 of digital photo 5 corresponding to the thumbnail 64 at the same time.

The user can confirm the plurality of thumbnails 64 to analyze the finishes of the respective digital photos 5 by comparison between the TV values 17, the shutter speeds 61, the AV values 18, the diaphragm values 62, the shooting record EV values 19, the ISO sensitivities 63, and the sensitivity correction values 20 of the digital photos 5 in the plurality of digital photos 5. The thumbnail 64b is selected by the user. In response to the selection of the thumbnail 64b, the CPU 2 calculates the TV value 17, the AV value 18, the shooting record EV value 19, and the sensitivity correction value 20 of the digital photo 5b to display these values in the display window 21. Accordingly, the user can select one of the thumbnails 64 displayed on the three-dimensional matrix 22 to easily know the TV value 17, the AV value 18, the shooting record EV value 19, and the sensitivity correction value 20 of the digital photo 5 corresponding to the selected thumbnail 64.

Figure 7:
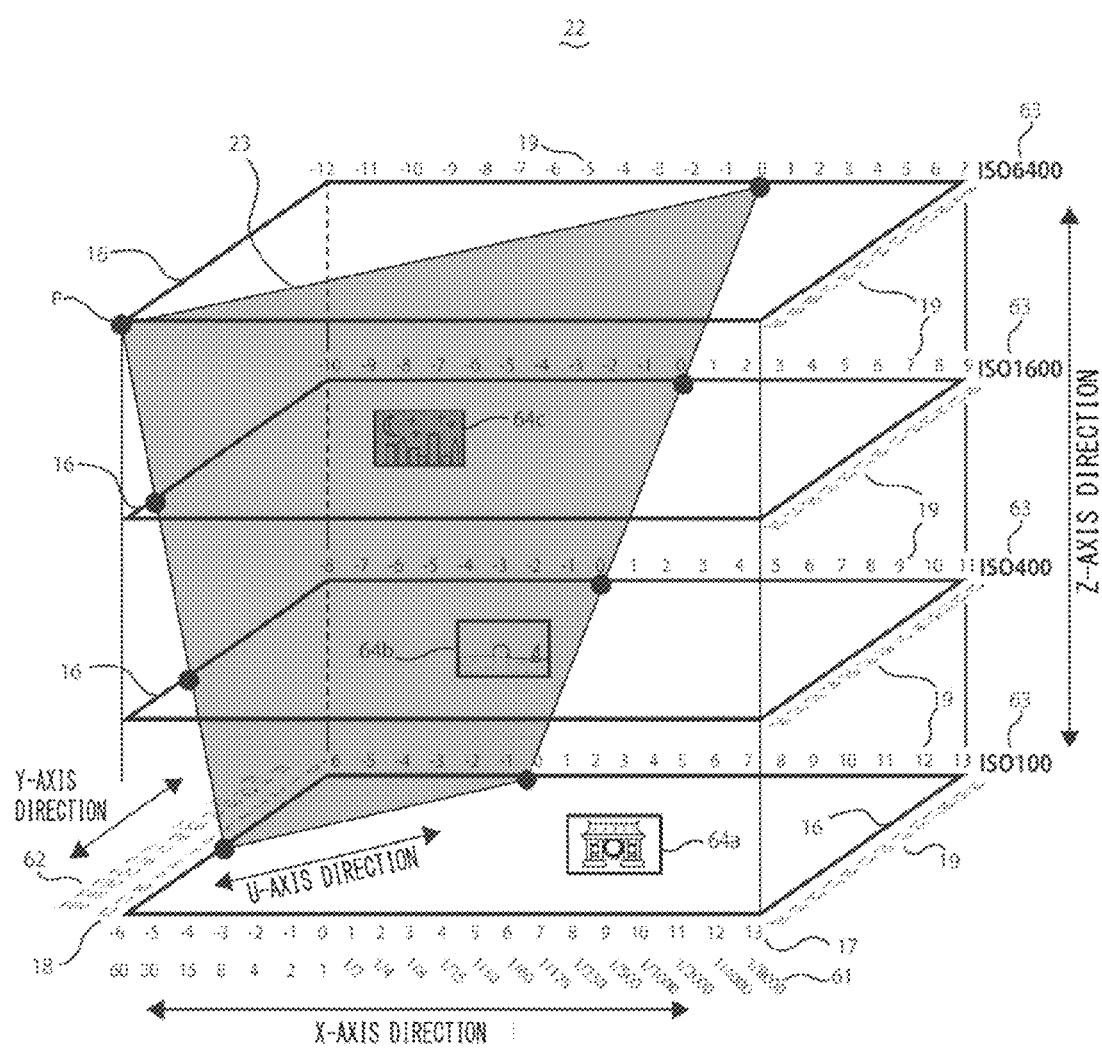
FIG. 7 is a diagram illustrating one example of a shooting record EV value plane according to this embodiment.

FIG. 7 illustrates one example of a shooting record EV value plane 23. The shooting record EV value plane 23 is displayed on the three-dimensional matrix 22 in response to an input of the instruction for displaying the shooting record EV value plane 23 through the input unit 9 when the display unit 8 displays the three-dimensional matrix 22. The shooting record EV value plane 23 shows the plane having the identical values of the shooting record EV value 19. In FIG. 7, the shooting record EV value plane 23 shows the plane where the shooting record EV value 19 is 0 on the three-dimensional matrix 22. The three-dimensional matrix 22 display plots P in the intersection points between the end portion of the shooting record EV value plane 23 and the end portions of the plurality of the two-dimensional matrices 16.

The user can input any shooting record EV value 19 through the input unit 9 to display the shooting record EV value plane 23 having the identical shooting record EV values 19 on the three-dimensional matrix 22. The user can display the shooting record EV value plane 23 to more accurately obtain the relationship between the thumbnails 64 and any shooting record EV value 19 on the three-dimensional matrix 22 and the three-dimensional positional relationship between the plurality of the thumbnails 64.

Figure 8:
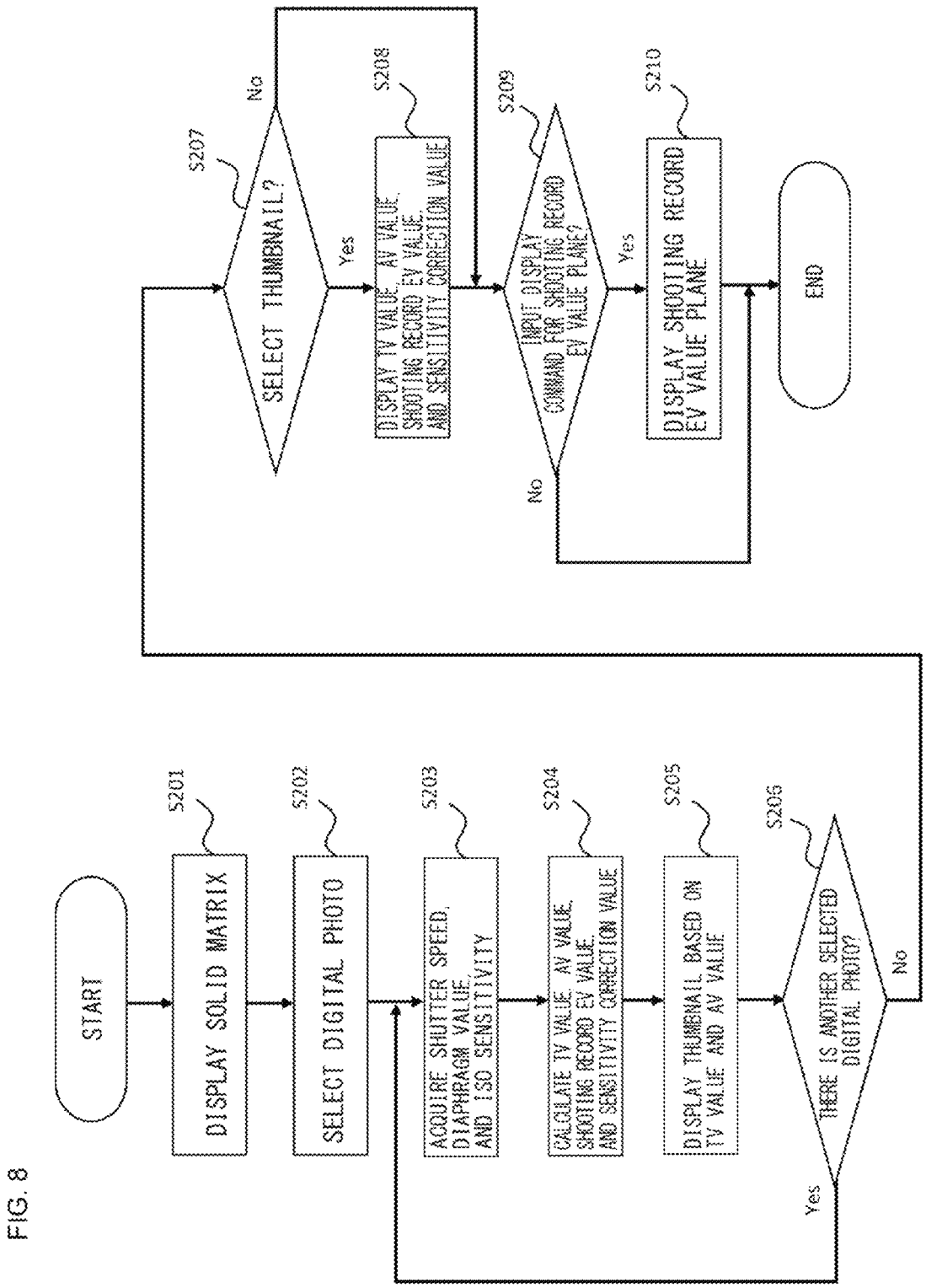
FIG. 8 is a flowchart illustrating a display process of the three-dimensional matrix according to this embodiment.

FIG. 8 illustrates the procedure of the display process for the three-dimensional matrix 22 according to this embodiment. The CPU 2 displays the three-dimensional matrix 22 on the display unit 8 in response to an input of the instruction for displaying the three-dimensional matrix 22 through the input unit 9 (in S201). In response to a selection of the digital photo 5 through the input unit 9 (in S202), the CPU 2 refers to the attached information 6 of the selected digital photo 5 to acquire the shutter speed 61, the diaphragm value 62, and the ISO sensitivity 63 (in S203).

The CPU 2 calculates the TV value 17, the AV value 18, the shooting record EV value 19, and the sensitivity correction value 20 of the digital photo 5 based on the acquired shutter speed 61, diaphragm value 62, and ISO sensitivity 63 and Formula 1 to 4 (in S204). The CPU 2 causes the display unit 8 to display the thumbnail 64 of the selected digital photo 5 on the three-dimensional matrix 22 based on the ISO sensitivity 63 and the calculated TV value 17 and AV value 18 (in S205). The CPU 2 determines whether another selected digital photo 5 is present (in S206).

In step S206, when the other selected digital photo 5 is present (Yes in S206), the CPU 2 executes the processes in steps S203 to S206. On the other hand, in step S206, when another selected digital photo 5 is not present (No in S206), the CPU 2 executes the process in step S207. The CPU 2 determines whether one of the thumbnails 64 displayed on the three-dimensional matrix 22 is selected through the input unit 9 (in S207).

In step S207, in the case where the thumbnail 64 is not selected (No in S207), the CPU 2 executes the process in step S209. On the other hand, in step S207, in response to a selection of one of the thumbnails 64 (Yes in S207), the CPU 2 displays the TV value 17, the AV value 18, the shooting record EV value 19, and the sensitivity correction value 20 of the digital photo 5 corresponding to the selected thumbnail 64 within the display window 21 (in S208).

The CPU 2 determines whether the instruction for displaying the shooting record EV value plane 23 is input through the input unit 9 (in S209). In step S209, in the case where the instruction for displaying the shooting record EV value plane 23 is not input (No in S209), the CPU 2 terminates the procedure of the display process for the three-dimensional matrix 22. On the other hand, in the step S209, in the case where the instruction for displaying the shooting record EV value plane 23 is input (Yes in S209), the CPU 2 further acquires the shooting record EV value 19 input through the input unit 9 to display this plane having the mutually identical shooting record EV values 19 in the three-dimensional matrix 22 as the shooting record EV value plane 23 (in S210) and then terminates the procedure of the display process for the three-dimensional matrix 22.

The user can display the plurality of the thumbnails 64 on the three-dimensional matrix 22 to easily know the relationships between the TV values 17, the AV values 18, the shooting record EV values 19, the ISO sensitivities 63, and the sensitivity correction values 20 of the digital photos 5 corresponding to the respective thumbnails 64. The user can display the shooting record EV value plane 23 on the three-dimensional matrix 22 to accurately obtain and analyze the positional relationship between the plurality of the thumbnails 64 and the shooting record EV values 19 in the three-dimensional matrix 22.

Figure 9:
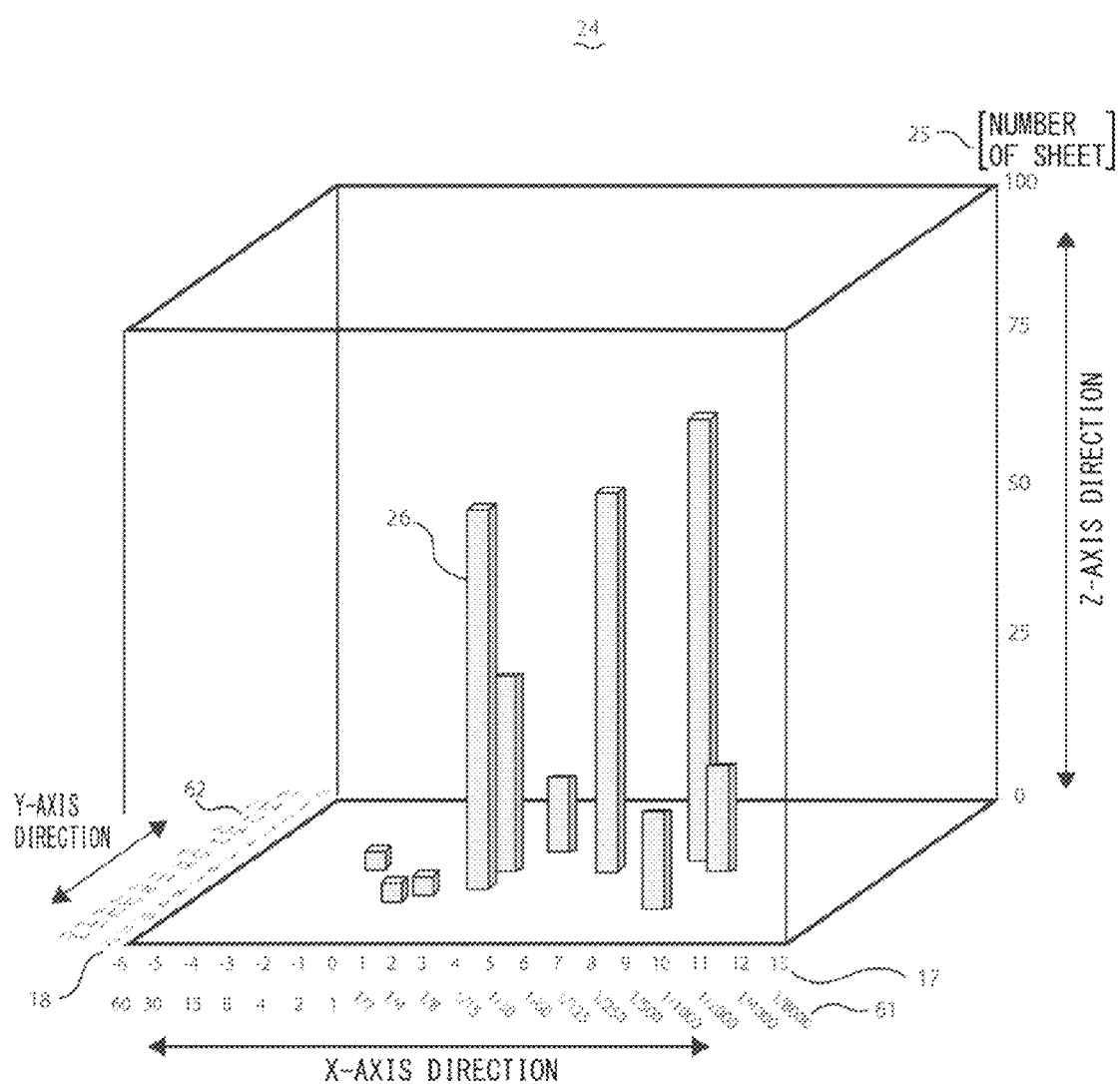
FIG. 9 is a diagram illustrating one example of a number-of-sheet distribution graph according to this embodiment.

FIG. 9 illustrates one example of a number-of-sheet distribution graph 24 illustrating the number-of-sheet distribution of the digital photo 5. The number-of-sheet distribution graph 24 includes the X-axis and the Y-axis that are perpendicular to the bottom face. As the scale of the X-axis, the TV value 17 and the shutter speed 61 are displayed in parallel. As the scale of the Y-axis, the AV value 18 and the diaphragm value 62 are displayed in parallel. The number-of-sheet distribution graph 24 includes the Z-axis perpendicular to the X-axis and the Y-axis. As the scale of the Z-axis, a number-of-sheet 25 of the digital photo 5 is displayed.

In response to a selection of a plurality of the digital photos 5 by the user, the CPU 2 calculates the TV values 17 and the AV values 18 of the respective digital photos 5. The CPU 2 counts the number-of-sheet 25 of the digital photo 5 for each set of the TV value 17 and the AV value 18 so as to display a bar chart 26 corresponding to the TV value 17, the AV value 18, and the number-of-sheet 25 of the digital photo 5 in the number-of-sheet distribution graph 24. Accordingly, the user can refer to the number-of-sheet distribution graph 24 to easily know the characteristics and the trend of the plurality of the digital photos 5.

Here, the apparatus 1 according to the present invention is not limited to the configuration of this embodiment, and various modifications are possible. The apparatus 1 may have the configuration that displays the plots P instead of the thumbnails 64 on the two-dimensional matrix 16 and the three-dimensional matrix 22. The apparatus 1 may have the configuration that displays the TV value 17, the AV value 18, the shooting record EV value 19, the sensitivity correction value 20 to be displayed within the display window 21 as coordinates such as (5, 3, 6, −2).

What is claimed is:

1. A digital-photo analyzing apparatus for analyzing a digital photo, the digital photo including attached information that stores: a diaphragm value; a shutter speed;
and an ISO sensitivity when the digital photo is shot, the digital-photo analyzing apparatus comprising:
an input unit configured to receive an instruction from a user;
a storage unit configured to store the digital photo and the attached information;
a display unit configured to display a two-dimensional matrix and the digital photo, the two-dimensional matrix including: an X-axis using any one of the shutter speed and a TV value as a scale; and a Y-axis that is perpendicular to the X-axis and using any one of the diaphragm value and an AV value as a scale; and
a control unit configured to calculate a shooting record EV value based on the AV value, the TV value, and the ISO sensitivity, wherein
the two-dimensional matrix further includes a U-axis using the shooting record EV value in a diagonal direction determined by the X-axis and the Y-axis as a
the control unit is configured to calculate the shooting record EV value of the digital photo based on a specified formula in response to a selection of the digital photo through the input unit, the specified formula having the AV value, the TV value, and the ISO sensitivity as variables, the specified formula being defined as follows:

Shooting Record EV Value=AV Value+TV Value+ Sensitivity Correction Value;

wherein the sensitivity correction value is defined as $$-\log_2\left(\frac{ISO\ \text{Sensitivity}}{100}\right),$$

and the digital-photo analyzing apparatus is configured to display a plot or a thumbnail of the digital photo on the two-dimensional matrix based on: any one of the shutter speed and the TV value; and any one of the diaphragm value and the AV value.

2. The digital-photo analyzing apparatus according to claim 1, wherein
the control unit is configured to display the shooting record EV value for the digital photo corresponding to the plot or the thumbnail on the display unit in response to a selection of one of the plot and the thumbnail displayed on the two-dimensional matrix through the input unit.

3. The digital-photo analyzing apparatus according to claim 1, wherein
the control unit is configured to:
compare the shooting record EV value on a U-axis in the two-dimensional matrix in one of the plot and the thumbnail with the shooting record EV value calculated for the digital photo corresponding to one of the plot and the thumbnail in response to a selection of one of the plot and the thumbnail displayed on the two-dimensional matrix through the input unit; and
change a scale on the U-axis to the calculated shooting record EV value for a display on the display unit in a case where the shooting record EV value on the U-axis is different from the calculated shooting record EV value.

4. The digital-photo analyzing apparatus according to claim 1, wherein
the control unit is configured to:
display a three-dimensional matrix on the display unit instead of the two-dimensional matrix, the three-dimensional matrix further including a Z-axis that is perpendicular to the X-axis and the Y-axis and uses the ISO sensitivity as a scale; and
display one of the plot and the thumbnail on the three-dimensional matrix based on: any one of the shutter speed and the TV value; any one of the diaphragm value and the AV value; and the ISO sensitivity, in response to a selection of the digital photo through the input unit.

5. The digital-photo analyzing apparatus according to claim 4, wherein
the control unit is configured to display a shooting record EV value plane on the display unit in response to an input of the shooting record EV value through the input unit, the shooting record EV value plane having the mutually identical shooting record EV values within the three-dimensional matrix.

6. A non-transitory computer-readable medium storing a digital-photo analyzing program for calculating a shooting record EV value of a digital photo using a computer, the computer including: a storage unit configured to store the digital photo and store a diaphragm value, a shutter speed, and an ISO sensitivity that are included with the digital photo when the digital photo is shot; an input unit configured to receive an instruction from a user; a display unit configured to display the digital photo; and a control unit configured to control the storage unit, the display unit, and the input unit, the control unit causing the computer to execute steps of:
calculating the shooting record EV value based on a specified formula in response to a selection of the digital photo through the input unit, the specified formula having the AV value, the TV value, and the ISO sensitivity of the digital photo as variables, the specified formula being defined as follows:

Shooting Record EV Value=AV Value+TV Value+ Sensitivity Correction Value;

wherein the sensitivity correction value is defined as $$-\log_2\left(\frac{ISO\ \text{Sensitivity}}{100}\right);$$

displaying a two-dimensional matrix on the display unit, the two-dimensional matrix including: an X-axis using any one of the shutter speed and the TV value as a scale; a Y-axis using any one of the diaphragm value and the AV value as a scale; and a U-axis using the shooting record EV value in a diagonal direction determined by the mutually perpendicular X and Y axes as a scale; and
displaying a plot or a thumbnail of the digital photo on the two-dimensional matrix based on: any one of the shutter speed and the TV value; and any one of the diaphragm value and the AV value of the digital photo.

7. The non-transitory computer-readable medium storing a digital-photo analyzing program according to claim 6, wherein
the control unit further causes the computer to execute a step of:
displaying the shooting record EV value for the digital photo corresponding to the plot or the thumbnail on the display unit in response to a selection of one of the plot and the thumbnail displayed on the two-dimensional matrix through the input unit.

8. The non-transitory computer-readable medium storing a digital-photo analyzing program according to claim 6, wherein
the control unit further causes the computer to execute steps of:
comparing the shooting record EV value on a U-axis in the two-dimensional matrix in one of the plot and the thumbnail with the shooting record EV value calculated for the digital photo corresponding to one of the plot and the thumbnail in response to a selection of one of the plot and the thumbnail displayed on the two-dimensional matrix through the input unit; and
changing a scale on the U-axis to the calculated shooting record EV value for a display on the display unit in a case where the shooting record EV value on the U-axis is different from the calculated shooting record EV value.

9. The non-transitory computer-readable medium storing a digital-photo analyzing program according to claim 6, wherein
the control unit further causes the computer to execute steps of:
displaying a three-dimensional matrix on the display unit instead of the two-dimensional matrix, the three-dimensional matrix further including a Z-axis that is perpendicular to the X-axis and the Y-axis and uses the ISO sensitivity as a scale; and displaying one of the plot and the thumbnail on the three-dimensional matrix based on: any one of the shutter speed and the TV value; any one of the diaphragm value and the AV value; and the ISO sensitivity, in response to a selection of the digital photo through the input unit.

10. The non-transitory computer-readable medium storing a digital-photo analyzing program according to claim 9, wherein the control unit further causes the computer to execute a step of:

displaying a shooting record EV value plane on the display unit in response to an input of the shooting record EV value through the input unit, the shooting record EV value plane having the mutually identical shooting record EV values within the three-dimensional matrix.

* * * * *